United States Patent
Judkins

(10) Patent No.: US 6,375,705 B1
(45) Date of Patent: Apr. 23, 2002

(54) OXIDE-DISPERSION STRENGTHENING OF POROUS POWDER METALURGY PARTS

(75) Inventor: Roddie R. Judkins, Knoxville, TN (US)

(73) Assignee: U. T. Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/277,851

(22) Filed: Mar. 26, 1999

(51) Int. Cl.⁷ .................. C22C 33/02; C22C 38/06; B22F 3/10; B22F 3/24
(52) U.S. Cl. ................ 75/235; 75/246; 419/2; 419/19; 419/29; 419/42; 419/60
(58) Field of Search ........................ 75/246, 235; 419/2, 419/49, 46, 19, 42, 60, 29

(56) References Cited

U.S. PATENT DOCUMENTS

| | | | |
|---|---|---|---|
| 4,961,903 A | * | 10/1990 | McKamey et al. |
| 5,084,109 A | * | 1/1992 | Sikka |
| 5,238,645 A | * | 8/1993 | Sikka et al. |
| 5,320,802 A | * | 6/1994 | Liu et al. |
| 5,545,373 A | * | 8/1996 | Maziasz et al. |
| 5,637,819 A | * | 6/1997 | Schneibel |
| 5,976,458 A | * | 11/1999 | Sikka et al. ............ 419/45 |
| 6,033,623 A | * | 3/2000 | Deavi et al. ............ 419/45 |

OTHER PUBLICATIONS

Hurley et al., "Iron Aluminide Hot Gas Filters", *Proc. Advanced Coal–Fired Power Systems, '96 Review Meeting*, DOE Fed. Energy Tech. Ctr., Morgantown, W.V. 1996.*

Judkins et al. "Metal Filter Materials in Combustion Environments", *Proc. Advanced Coal–Fired Power Systems '96 Review Meeting*, DOE, Fed. Energy Tech. Ctr., Morgantown W.V. 1996.*

* cited by examiner

*Primary Examiner*—Daniel J. Jenkins
(74) *Attorney, Agent, or Firm*—J. Herbert O'Toole; Nexsen Pruet Jacobs & Pollard, LLC

(57) ABSTRACT

Oxide dispersion strengthening of porous metal articles includes the incorporation of dispersoids of metallic oxides in elemental metal powder particles. Porous metal articles, such as filters, are fabricated using conventional techniques (extrusion, casting, isostatic pressing, etc.) of forming followed by sintering and heat treatments that induce recrystallization and grain growth within powder grains and across the sintered grain contact points. The result is so-called "oxide dispersion strengthening" which imparts, especially, large increases in creep (deformation under constant load) strength to the metal articles.

14 Claims, No Drawings

OXIDE-DISPERSION STRENGTHENING OF POROUS POWDER METALURGY PARTS

The U.S. Government has rights in this invention pursuant to contract No. DE-AC05-96OR22464 between the Department of Energy and Lockheed Martin Energy Research Corporation.

BACKGROUND OF THE INVENTION

1. Field of the Invention

This invention relates to alloys for use in high temperature, corrosive environments. More particularly, it relates to alloys and porous metal filters and other less-than-fully dense components made from the alloys.

2. Description of the Prior Art

Pressurized fluidized bed combustion (PFBC) systems and integrated gasification combined cycle (IGCC) systems offer high efficiency methods for extracting energy from fossil fuels. Both systems operate at high temperatures and produce a high temperature gas which contains particulates and corrosive gases. Systems under development are expected to require filters operational in the range of 400–930° C. (750–1700° F.). Ceramic filters are susceptible to failure especially at the higher temperatures due to poor resistance to thermal and mechanical shock. Porous sintered metal filters offer an alternative to ceramics if corrosion resistance can be obtained in a sufficiently ductile material to be readily fabricated.

Full density iron aluminides have been known since 1930 [Sykes et al., *J. Iron and Steel Inst.*, 130, 389 (1930)]. The excellent corrosion resistance, comparatively low density low cost and tensile strengths make them a favorable alternative to ferritic and austenitic steels. Unfortunately, the ductility of the alloys at room temperature makes them difficult to fabricate and their reduced strength at temperatures over 600° C. has limited their use in hot corrosive atmospheres.

Adjustments to the ratio of Fe to Al and the addition of minor amounts of other metals have resulted in improved ductility and tensile yield strengths. See U.S. Pat. Nos. 4,961,903, 5,084,109, 5,238,635 and 5,320,802.

Less-than-full-density iron aluminide filters fabricated using powdered metal technology (hereinafter "sintered metal filters") have been fabricated and subjected to initial testing [Judkins et al., Proceedings of the Advanced Coal-Fired Power Systems '96 Review Meeting< DOE, Morgantown W. Va. 1996]. The sintered metal filters have improved corrosion resistance compared to SS 316 and 310 sintered filters but strength at temperatures above 700° C. is insufficient.

There remains a need for sintered metal filters which are stable and operable at temperatures above 700° C., preferably above 800° C. in both oxidizing and reducing atmospheres.

BRIEF SUMMARY OF THE INVENTION

It is an object of this invention to provide a sintered metal filter having improved corrosion resistance at temperatures above 700° C.

It is an object of this invention to provide a sintered metal filter having increased tensile strength at temperatures above 700° C. It is a further object of this invention to provide a sintered metal filter with improved creep resistance.

These and other objects of this invention may be obtained by the addition of an oxide-dispersion strengthening component to the alloy powder prior to fabrication and by heat treating the sintered filter to enhance grain growth.

DETAILED DESCRIPTION OF THE INVENTION

Pressurized fluid bed combustors produce gases with high oxygen partial pressures and sulfur as $SO_2$ (oxidizing atmosphere) IGCC and syngas furnaces produce gases with high sulfur partial pressure, low oxygen partial pressure and sulfur as hydrogen sulfide (reducing atmosphere). Both processes produce particulates characteristic of both the temperature of operation and the source of the fuel. Any suitable filter must not only be resistant to the hot gases passing through but also inert to the particulates since reaction with the filter material such as by sintering or production of low melting by-products will degrade efficiency during use and impede backflushing, thus shortening the life of the filter.

The alloys used in accordance with this invention are preferably prepared by melting the component elements in a furnace and casting into a billet. An alternative method, blending powders, may be used but rarely achieves the homogeneity desired. The billet is powderized as known in the art. Water atomization is preferred. Powders should be sieved to the range −100 to +325. The powders may be blended with a suitable binder and other sintering aid and shaped into a green form. Conventional binders are methyl cellulose and polyvinyl alcohol in a water base. Sintering aids include volatile or combustible materials that decompose on heating.

The manufacture of iron aluminide filters without oxide dispersions has been reported by Pall Corporation. The green body may be formed by extrusion, molding, casting or isostatic compression. The preferred method for forming a filter as a cylinder is to spin cast the powder in a ceramic tube. The result is a seamless cylinder. Fabrication from a sheet is not preferred because of the low ductility of the metal alloys and because welds in the filter matrix should be avoided for reasons of strength and area maximization.

The spun cast preform may be isostatically compressed by inserting a rubber bladder into the drained void in the ceramic tube and sealing that bladder to another surrounding the preform and compressing in a fluid using conventional methods.

Sintering should be performed with the green form still in the ceramic tube and in the vertical position. Iron aluminide is held in compression during heating since it has a higher coefficient of thermal expansion than does the ceramic tube. Upon sintering, the iron aluminide shrinks and is easily removed. Sintering may be done in a vacuum or an inert atmosphere of nitrogen, hydrogen, argon, etc.

Oxide dispersion strengthening may be enhanced by heat treating the sintered alloy at a temperature of 1250° C. or greater for from four to six hours. The extent of strengthening may be followed by metallographic examination of crystal formation and grain growth. Subsequent heat treatment should be done in an atmosphere of air which also serves as a method of preoxidation of the finished article. [J. Hurly, S. Brosius and M. Johnson, Pall Corp., "Iron Aluminide Hot Gas Filters", presented at the Advanced Coal-Fired Power Systems '96 Review Meeting, Morgantown Technology Center, Jul. 18, 1996.]

The alloy sintered metal filter according to this invention may be cut, ground, welded and otherwise manipulated using conventional techniques of metal fabrication. Tubular filters may be cut to length using a carbide saw, dressed with a grinding wheel and welded to end fittings. SS 310 or 316 is readily joined by TIG welding using rods suitable for the SS component.

The preferred base alloy for the sintered metal filters of this invention are those iron aluminides disclosed in U.S. Pat. Nos. 4,961,903, 5,084,109, 5,238,645 and 5,320,802. Most preferred are those base iron aluminides having at least 20 atomic percent Al.

Oxides suitable for the practice of this invention are $HfO_2$, $CeO_2$ and $Y_2O_3$. Yttrium oxide is most preferred. The amount of oxide may be in the range 0.05 to 0.3 cation percent metal as the oxide.

The practice of this invention is not limited to the iron aluminides discussed above and the use of other alloys with or without incorporation of iron aluminides is also contemplated to be a part of this disclosure.

The porosity of the sintered metal filters according to this invention may be adjusted using methods conventionally employed in the field of porous sintered metal technology. Sieve size of the powders, choice of binder and other additives, compression pressure and sintering temperature are known result effective variables. The porosity is most easily measured by determining the pressure needed to force air through the filter. The first bubble point should be in the range of 20–25 inches of water and the open bubble point should be about 5–10 inches greater. Typical void volume should be between 40 and 45%.

The strength of the filter may be measured by determining the "hoop strength", an internal pressurization test conducted in ambient air at room temperature using a positive radial-displacement wedge. Samples are O-rings (cross-sectional slices of a tubular filter) using the method of Tortorelli et at. *Mater. Sci. Eng. A,* 258, 115 (1998). The alloys of this invention having a nominal OD of 60 mm and a wall thickness of 2 mm shall have a peak load by this method of at least 150 MPa.

While not being bound by any theory, it is suggested that the improved strength of the sintered metal filters of this invention result from the formation of larger and denser grain sizes at the interfaces between the matrix elements of the filter.

EXAMPLE 1

A billet may be formed by melting together the elemental metals in the respective amounts required to yield an alloy within the composition ranges noted and casting the alloy into a mold. The billet may be converted to a powder by atomizing using water. The resulting powder may be sieved to the range 100 to +325 and slurried in a water based solution and poured into a ceramic cylinder having a closed end and a nominal ID of 60 mm and variable, say 50–100 cm length of. The ceramic cylinder may be closed and spun in a lathe to deposit the powders uniformly on the interior of the cylinder. After decantation, the cylinder may be sealed inside and out with a rubber bladder and compressed in water. Upon removal of the bladder, the cylinders may be stacked on end in a furnace and the compressed powder sintered in a vacuum at a temperature of 1266° C. Upon removal from the cylinder, the sintered filter should be heat treated in air at 1100° C. for at least four hours. The finished sintered metal filter may be cut and dressed as required and welded to suitable end or connector fitting as required for the selected application.

I claim:

1. A porous sintered intermetallic alloy comprising, in atomic percent, 72–80% Fe, 20–28% Al and in cationic percent 0.05–0.3% of the element selected from the group consisting of Hf, Ce, Y in the form of an oxide selected from the group consisting of hafnia, ceria and yttria.

2. A porous sintered intermetallic alloy according to claim 1, further comprising, in atomic percent, 2–5 weight % $Cr_1$.

3. A porous sintered intermetallic alloy according to claim 1, wherein said element is Y.

4. A porous sintered intermetallic alloy according to claim 1 in the form of a tube.

5. A porous sintered intermetallic alloy tube according to claim 4 having a void volume between 40 and 45%.

6. A filter comprising at least one porous sintered intermetallic alloy tube according to claim 5.

7. A porous sintered intermetallic alloy according to claim 1 in the form of a sheet or plate.

8. A method of making an oxide dispersion strengthened porous sintered intermetallic alloy comprising:

isostatically compressing a powder comprising, in atomic percent, 72–80% Fe, 20–28% Al and, in cationic percent, 0.05–0.3% of an element selected from the group consisting of Hf, Ce and Y in the form of an oxide selected from the group consisting of Hafnia, ceria and yttria and a sintering aid which is volatile at sintering temperatures or which thermally decomposes at sintering temperatures;

sintering said compressed powder in a vacuum at a temperature of at least 1250° C. for at least four hours; and heat treating said sintered compressed powder in an atmosphere of air at a temperature of about 1100° C. for at least four hours.

9. A method according to claim 8 wherein said powder is formed by mixing the components in a melt, casting the melt into a billet and atomizing said billet.

10. A method according to claim 8 wherein said powder further contains at least 0.05 weight percent Y as yttria.

11. A method according to claim 8 wherein said powder further comprises 2–5 atomic % Cr.

12. A method according to claim 9, wherein said atomizing is water atomizing.

13. A porous sintered intermetallic alloy sheet or plate according to claim 7 having a void volume between 40 and 45%.

14. A filter comprising at least one porous sintered intermetallic alloy sheet or plate according to claim 13.

* * * * *